United States Patent
Smith et al.

(10) Patent No.: US 7,072,274 B2
(45) Date of Patent: Jul. 4, 2006

(54) ADAPTIVE MOUNTING SYSTEM FOR DATA STORAGE DEVICES

(75) Inventors: Gordon James Smith, Rochester, MN (US); Sri M. Sri-Jayantha, Ossining, NY (US)

(73) Assignee: Lenovo (Singapore) Pte, Ltd., Singapore (SG)

( * ) Notice: Subject to any disclaimer, the term of this patent is extended or adjusted under 35 U.S.C. 154(b) by 872 days.

(21) Appl. No.: 10/160,222

(22) Filed: May 31, 2002

(65) Prior Publication Data

US 2003/0223144 A1    Dec. 4, 2003

(51) Int. Cl.
*G11B 17/00*    (2006.01)
(52) U.S. Cl. .................. 369/247.1; 369/263.1
(58) Field of Classification Search ............. None
See application file for complete search history.

(56) References Cited

U.S. PATENT DOCUMENTS

| | | | | |
|---|---|---|---|---|
| 5,281,978 A | * | 1/1994 | Kojima et al. | 347/257 |
| 6,164,614 A | * | 12/2000 | Lim et al. | 248/634 |
| 6,310,746 B1 | * | 10/2001 | Hawwa et al. | 360/97.01 |
| 6,487,039 B1 | * | 11/2002 | Bernett | 360/97.02 |
| 6,760,180 B1 | * | 7/2004 | Kino et al. | 360/75 |
| 6,819,520 B1 | * | 11/2004 | Carley | 360/77.03 |
| 6,898,051 B1 | * | 5/2005 | Bahirat et al. | 360/99.08 |

* cited by examiner

*Primary Examiner*—Paul W. Huber
(74) *Attorney, Agent, or Firm*—William N. Hogg; Driggs, Hogg & Fry Co., LPA

(57) ABSTRACT

An apparatus and method reduce the transfer of vibration to and/or from a data a data transfer mechanism in a data storage device by coupling an adaptive mount responsive to an electrical stimulus to the data transfer mechanism. In one embodiment of the invention, a controller reads a signal that relates to the position error of a read/write component in a data transfer mechanism, applies an algorithm, and varies the damping of an adaptive mount coupled to the data transfer mechanism. The controller may be further configured to report an error to a host system that identifies a substandard data transfer mechanism so that such data transfer mechanism can be repaired or replaced.

8 Claims, 3 Drawing Sheets

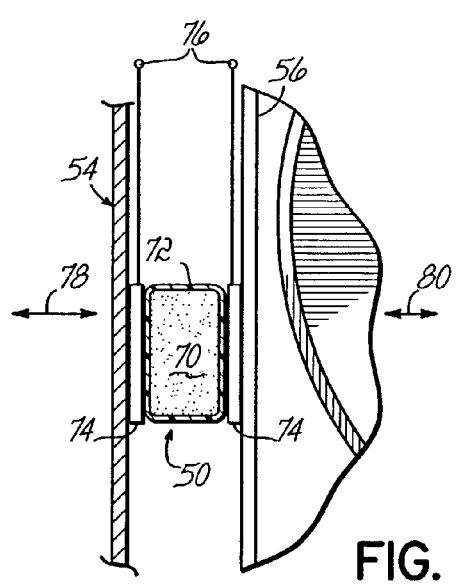
FIG. 4
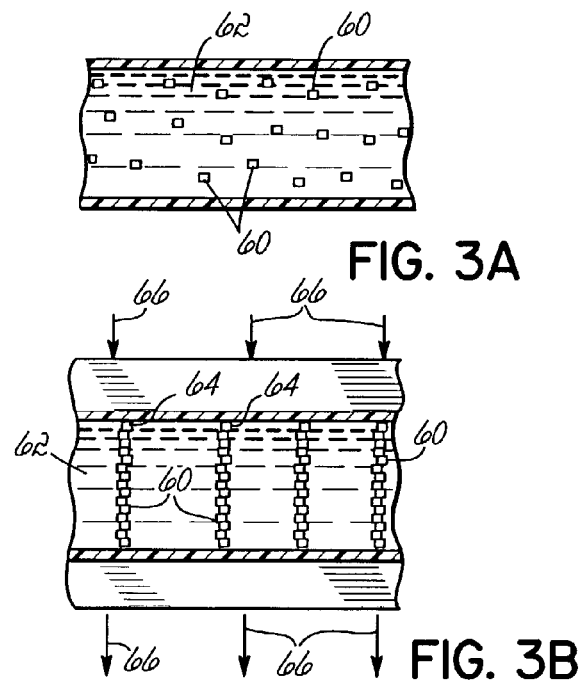
FIG. 3A
FIG. 3B
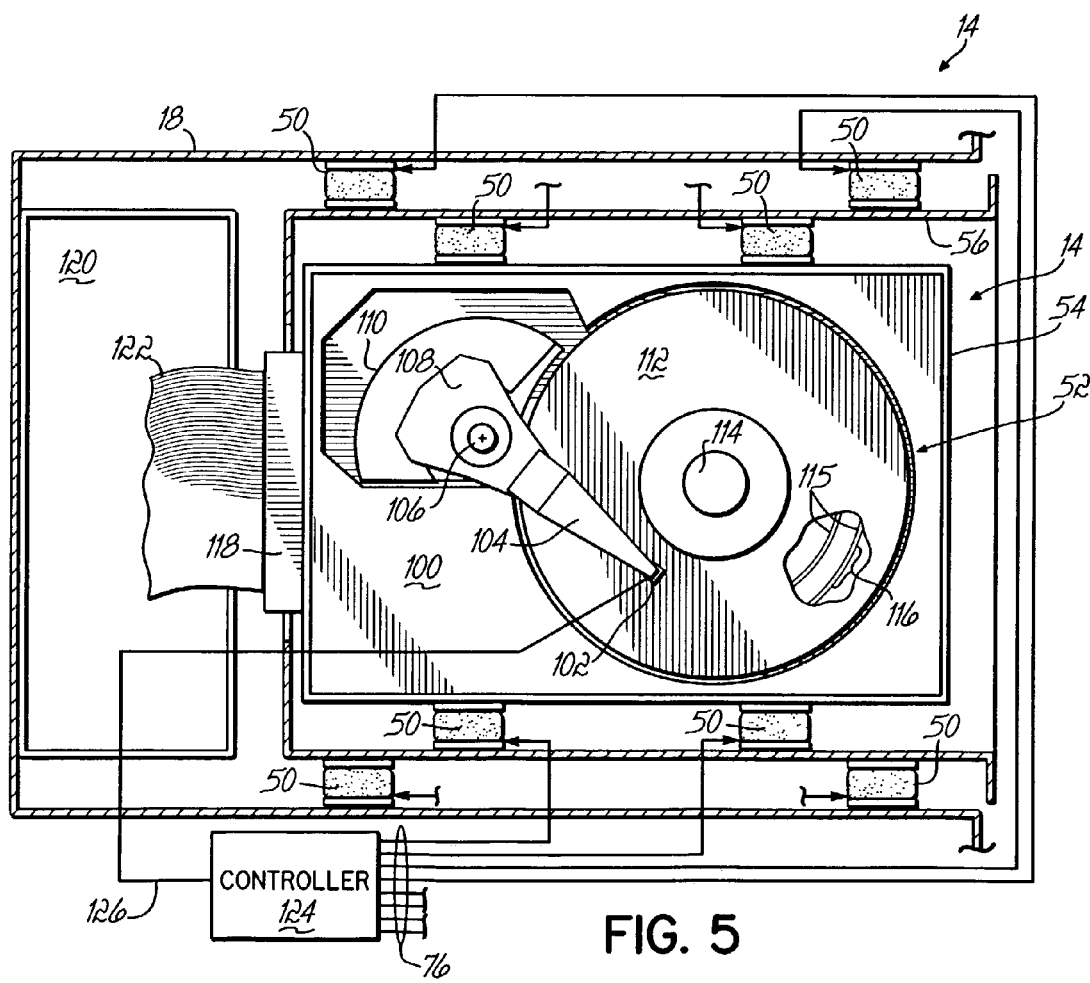
FIG. 5

ADAPTIVE MOUNTING SYSTEM FOR DATA STORAGE DEVICES

FIELD OF THE INVENTION

The present invention relates to data storage devices. More particularly, it relates to an adaptive mount used in conjunction with a data storage device.

BACKGROUND OF THE INVENTION

Today there is an ever increasing demand on data storage capacity. The demand for increased data storage capacity is fueled by the development of new processors that run faster and faster, executing more and more instructions per second. The programs containing these instructions have also become more voluminous, along with the data accessed by these programs. Consequently, data storage devices must also offer reduced access speed along with additional storage capacity.

In the case of disk drives, as the desire for reduced access speed and additional storage capacity grows, a renewed emphasis is placed on disk track density. Increased track density allows more data to be stored on a given disk size. Access time is also reduced since read/write mechanisms need not move as far between tracks to read or write data.

One criterion by which disk drive performance is measured is the number of tracks per inch (TPI) that can be repeatedly read and written. A servo system may be used to position a read/write mechanism relative to tracks on a disk. Such a system may reduce the number of read/write errors by continuously repositioning the read/write head relative to the tracks.

Even when a servo system is used, external vibration can cause misalignment of a read/write mechanism which can further cause read/write errors. As a result, current disk drives tend to be limited in capacity. Moreover, as track densities increase, the linear and rotational vibration of a drive emerges as a dominant TMR (track miss registration component) contributing to the positioning error of a read/write head. The bandwidths available in servo systems in many disk drives are limited in their ability to deal with TMR errors associated with high track densities.

In addition, some computer systems may consist of an array of disk drives wherein each drive contributes to the total vibrational environment a particular drive is subjected to. Read/write mechanism positioning accuracy in a drive in one of these arrays is subject to internal as well as external vibrations.

Several approaches have been taken in accounting for the vibration challenged environment of these drives. These approaches range from passive mounting systems to sophisticated servo algorithms.

One approach uses a disk mounting system with passive and discrete isolation mounts that reduce the rotational motion due to spindle induced self vibration with a disk drive. However, passive mounting systems are generally designed to address vibration at a specific frequency. Thus, passive mounting systems are not capable of adapting their damping to account for both internal and external sources of vibration that occur at different resonant frequencies.

Another approach is an algorithm that manages a frequency specific run out error component generated by spindle vibration or disk shift effect. This algorithm is used with a servo system to isolate a disk drive from internal vibrations caused by a spindle or disk that is out of balance.

Yet another approach senses the rotational motion of a disk drive and sends a feed forward signal to an actuator that repositions a read/write head along a track so as to minimize read/write errors caused by the vibration of the disk.

Although conventional methods may reduce the effects of vibration internal to a disk drive in certain applications, such methods often cannot accommodate all sources of vibration, or adapt to changes in the types of vibrations to which a drive might be subjected to over time. Further, as track densities continue to increase, the effects of vibrations will become more problematic.

Therefore, a significant need exists in the art for a manner reducing the effects of both internal and external vibrations errors in a disk drive so that track densities may be increased and access times reduced without concern for excessive vibration induced errors.

SUMMARY OF THE INVENTION

The invention addresses these and other problems associated with the prior art by providing an apparatus and method in which an adaptive mount is coupled to a data transfer mechanism in a data storage device such as a disk drive to reduce the transfer of vibration to and/or from the data transfer mechanism. The adaptive mount may be internally disposed within a data storage device, e.g., intermediate the data transfer mechanism and a housing, and/or may be disposed external to a data storage device, e.g., between the data transfer device and a frame and/or enclosure within which the data storage device is mounted.

In one embodiment consistent with the invention, a controller is configured to read a signal that relates to the positioning error of a read/write component in a data transfer mechanism, apply an algorithm, and vary the damping of an adaptive mount coupled to the data transfer mechanism. The controller may be further configured to report an error to a host system that identifies a substandard data transfer mechanism so that such data transfer mechanism can be repaired or replaced.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

BRIEF DESCRIPTION OF THE DRAWINGS

FIG. 3A is an illustration of magnetic particles randomly distributed throughout a fluid that may be used in an adaptive mount.

FIG. 3B is an illustration of magnetic particles in a fluid subject to an external field that may be used in an adaptive mount.

FIG. 4 is a sectional view of an encapsulated ER material adaptive mount coupled between a disk drive housing and a frame in a data storage device illustrated in FIGS. 1 and 2.

FIG. 5 is partial sectional view of the data storage device incorporating the adaptive mounting shown in FIGS. 1, 2, and 4.

DETAILED DESCRIPTION

The embodiments discussed hereinafter address the problems associated with internal and external vibrations found in a data storage device by utilizing adaptive mounting to dampen the transfer of vibration to and/or from a data transfer mechanism in the data storage device. A data transfer mechanism, in this context, may incorporate practically any vibration-sensitive component in a data storage device, e.g., a read/write head, an actuator assembly, spindle motor system, etc. In lieu of, or in addition to, a vibration-sensitive component, a data transfer mechanism may also incorporate a vibration-generating component, e.g., a rotating disk, spindle motor, actuator, etc. Moreover, a data storage device in this context may include practically any device capable of reading and/or writing data from or to a storage medium, e.g., a magnetic disk drive, an optical drive, a tape drive, removable storage device, etc.

Sources of vibration for such devices may be internal or external to the device. As an example, an internal source of vibration may be an out of balance disk, motor or spindle. A disk with a nonconcentric center hole might also cause an internal vibration. External sources of vibration may include, but are not limited to, fan vibrations, vibrations from other drives, vibrations from printers, footsteps on a floor, aerodynamic turbulence in the room or housing, and walking/jogging for those devices implemented into a portable device.

An adaptive mount consistent with the invention incorporates a variable response to vibration under the control of an electrical stimulus. As will become apparent below, a wide variety of mounting structures may be utilized to provide adaptive mounting consistent with the invention. In addition, as will also be discussed in further detail below, a controller may be configured to read a signal that relates to the positioning error of a read/write component in the data transfer mechanism, apply an algorithm, and controllably vary the damping or stiffness of an adaptive mounting. The controller may be further configured to report an error to a host system that identifies a substandard data transfer mechanism so that such data transfer mechanism can be repaired or replaced.

Figure 1:
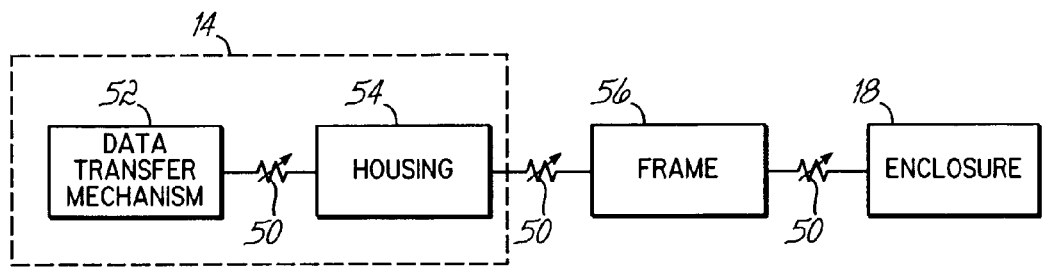
FIG. 1 is a block diagram of a data storage device incorporating adaptive mounting consistent with the invention.

Now turning to the Drawings, wherein like numbers denote like parts throughout the several views, FIG. 1 shows several possible usages of an adaptive mount in an exemplary data storage device 14. In general, an adaptive mount consistent with the invention may be used to isolate vibrations inherent in a data storage device or to prevent vibrations external to a data storage from interfering with its operation. This is accomplished through the use of one or more adaptive mounts that are responsive to an electrical stimulus.

An adaptive mount may generally be disposed intermediate a data transfer mechanism and a structural member disposed within or external to a data storage device, For example, as shown in FIG. 1, an adaptive mount 50 may be coupled between a data transfer mechanism 52 and a housing 54. As another example, an adaptive mount 50 may be coupled between a housing 54 and a frame 56. As yet another example, an adaptive mount 50 may be coupled between a frame 56 and an enclosure 18. In the latter two situations, the adaptive mounting may be incorporated into a disk drive array to isolate vibrations between multiple data storage devices, and/or to isolate vibrations that are external to an array.

One skilled in the art having the benefit of the instant disclosure will appreciate that any number of adaptive mounts may be utilized in a data storage device consistent with the invention. For example, any combination of adaptive mounts maybe disposed throughout a structure to effectively isolate a data transfer mechanism from its surroundings.

Figure 2:
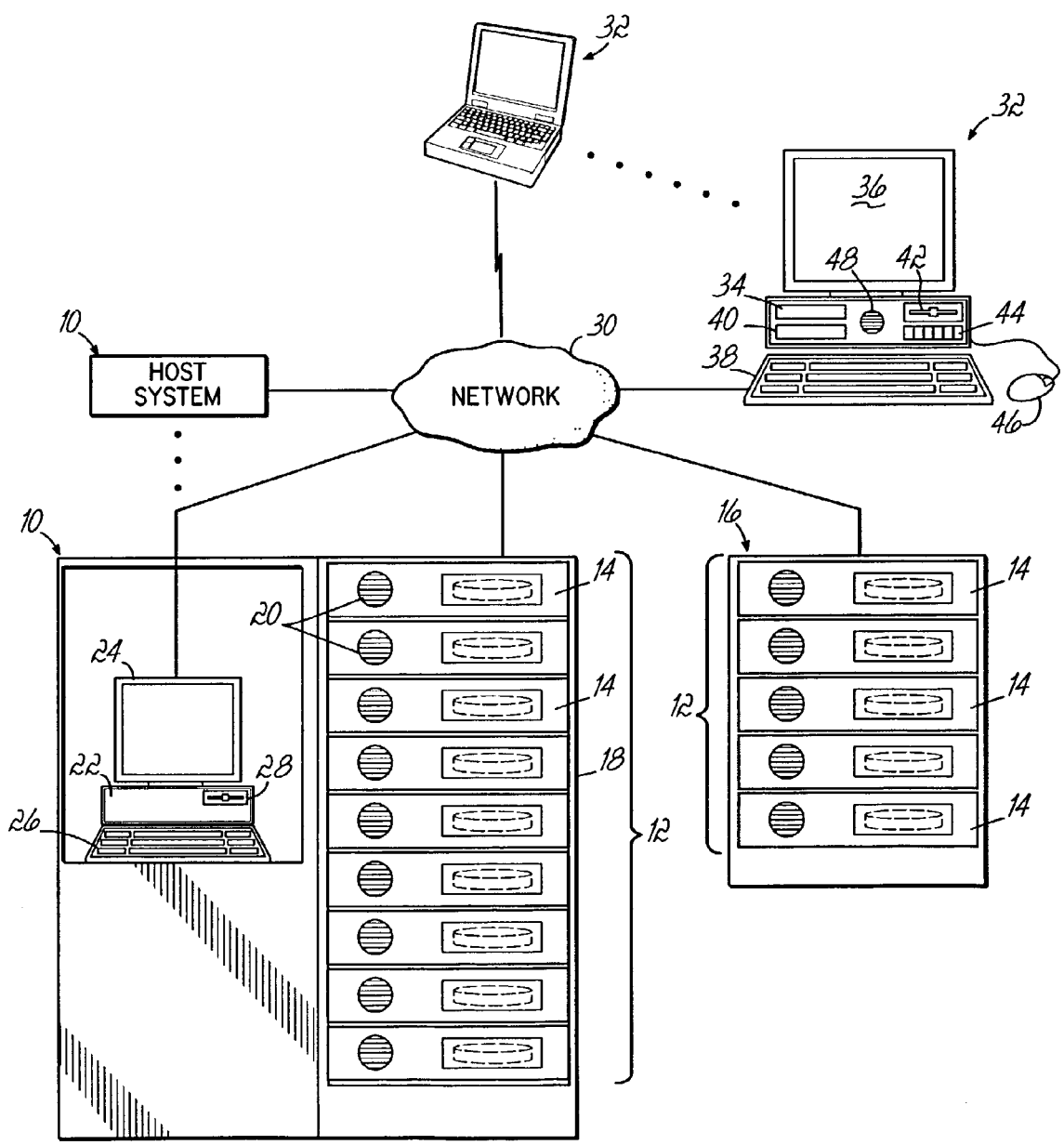
FIG. 2 is an illustration of a computer environment incorporating a variety of data storage devices capable of incorporating the adaptive mounting of FIG. 1.

Now turning to FIG. 2, a computer environment incorporating a variety of data storage devices capable of incorporating adaptive mounting consistent with the present invention is illustrated. For example, a host system 10 may support an array 12 of data storage devices 14, each of which may include adaptive mounting. An array 12 of data storage devices 14 may also be configured as a stand alone unit 16 and include adaptive mounting.

Further, data storage devices 14 including adaptive mounting may be installed in an enclosure 18 having a frame, the frame transferring vibration between the data storage devices. The data storage devices 14 may optionally include fans 20 for cooling, another source of vibration. The data storage devices 14 in the arrays 12 may be interconnected with each other through a backplane or bus (not shown), also capable of transferring vibration between the data storage devices 14.

A host system 10 comprising a processor 22 for executing program code, a display 24, and a keypad 26 for user data entry may also include a data storage device 28 incorporating adaptive mounting. Host system 10 may be connected through a network, such as network 30, network 30 referring to local area networks (LANs) and storage area networks (SANs), among others, with other host systems 10, that may or may not host arrays 12 of data storage devices 14, or arrays 12 of data storage devices 14 configured as stand alone units 16, all of which may include adaptive mounting. When networked, the data storage devices 14 having adaptive mounting may be made accessible across the network 30 for a variety of storage needs.

Host system 10 may also be networked with personal computers, such as personal computer 32. A personal computer may also be in the form of a laptop or other portable electronic device. Personal computer 32 may comprise a processor 34, a display 36, a keyboard 38, a hard drive 40, a floppy disk drive 42, and a compact disk drive 44, as well as other peripherals, such as a mouse 46, etc. Personal computer 32 may also include a fan 48 for cooling internal components. The personal computer 32 hard drive 40, floppy disk drive 42, and optical disk drive 44 may also include adaptive mounting consistent with the invention.

Those skilled in the art will appreciate that the present invention is not limited to the aforementioned data storage devices but rather includes any data storage device susceptible to vibration and/or capable of generating unwanted vibration in a computer environment.

Returning to FIG. 2, an adaptive mount 50 may be constructed from a variety of materials having desirable damping characteristics. For example, adaptive mount 50 may be constructed of an electrically activated organic material with programmable properties or constructed from electromagnetic components. In either case, the stiffness, elasticity and/or damping of the mount may be electronically controlled.

Other materials that have controllable stiffness and damping characteristics may also be used without departing from the spirit of the invention. For example, magnetorheological (MR) fluids experience reversible changes in their rheological properties, apparent viscosity, plasticity, and elasticity, when subject to a magnetic field. Similarly, electrorheological (ER) fluids also experience reversible changes in rheological properties when subject to an electric field. Both of these types of materials are composed of small particles dispersed in a fluid or throughout an elastic matrix. ER and MR fluids are notable for their enormous increase in shear viscosity when an external field is applied increasing the viscosity several orders of magnitude.

Referring to FIGS. 3A and 3B, accompanying the rheological effects is a dramatic change in the suspension microstructure. For example, as shown in FIG. 3A, in the absence of an applied field, the magnetic particles 60 may be randomly distributed throughout an ER fluid 62, the fluid 62 behaving as a Newtonian liquid with a linear relationship between shear stress and strain rate. However, as shown in FIG. 3B, the particles 60 tend to align themselves in chains 64 in the presence of a magnetic field 66. In order for relative motion of the fluid 62 to occur, these chains 64 of particles 60 must be continuously broken and re-linked. This results in a nonlinear stress-strain relationship.

Both ER and MR elastomers demonstrate an increase in stiffness and damping properties when an external field is applied. Electro- and magnetostrictive elastomers deform under the influence of external fields. Further, these materials react rapidly to the applied field. The response time of ER materials may be on the order of 1–10 milliseconds, though other ER materials may be possible that respond at different rates. Both ER and MR fluids may be incorporated into an adaptive mount that is advantageously coupled to a housing, positioned between a frame and a housing, etc., and is configured to provide a controlled damping effect in response to an electrical stimulus in a data storage device.

Electrostatically stricted polymers (ESSP) also exhibit characteristics that may be desirable in an adaptive mount. Polymers with low elastic stiffness and high dielectric constant may be used to induce large actuation strain by subjecting the material to an electrostatic field. These characteristics produce longitudinal actuators that operate similar to biological muscles using Coulomb forces between electrodes to squeeze or stretch the polymer. When the polymer is constrained in an adaptive mount, the Coulomb forces change the stiffness and damping of the mount.

Other materials capable of varying in the transmission of vibrations responsive to an electrical stimulus may be used, including various piezoelectric polymers and ceramics, among others. Moreover, various mechanical, hydraulic, pneumatic, etc., structures capable of being modified to provide a varied damping effect in response to an electrical stimulus may also be used. The invention is therefore not limited to the particular materials and/or structures disclosed herein.

Referring now to FIG. 4, an sectional view of an encapsulated ER material adaptive mount 50 is illustrated. Adaptive mount 50 comprises an ER material 70 housed in a flexible capsule 72 and electrodes, or plates, 74. Adaptive mount 50 is coupled between a disk drive housing 54 and a frame 56, as discussed in conjunction with FIG. 2. As is also shown in this figure, an adaptive mount 50 may also be coupled between a data transfer mechanism 52 and a disk drive housing 54 or a frame 56 and an enclosure 18, as also shown in FIG. 2.

Referring again to FIG. 4, an electromotive force 76 is applied to the electrodes 74, subjecting ER material 70 to an electrical field. The electrical field varies the damping of the adaptive mount 50 in response to the applied electromotive force. Thus, adaptive mount 50 isolates a disk drive housing 54 from vibrations 80 external to the disk drive housing in response to an electrical stimulus. Conversely, adaptive mount 50 prevents or reduces vibrations 78 from within the disk drive housing 54 from transferring to frame 56. In instances where multiple data storage devices are coupled to a common structure using adaptive mounts 50, vibrations within each drive that interfere with other drives are reduced. Similarly, external vibration to all of the drives is also reduced.

Referring to FIG. 5, a sectional view of an embodiment of data storage device 14 including features of the present invention is shown. The present invention utilizes adaptive mounts 50 to provide a controlled damping effect for data storage device 14. The adaptive mounts 50 provide a controlled damping effect in response to an electrical stimulus.

Data storage device 14 is mounted in an enclosure 18. Data storage device 14 is comprised of a disk drive housing 54 and a data transfer mechanism 52. Adaptive mounts 50 may also be coupled between a frame 56 (e.g., a frame for supporting an array of data storage devices) and the data storage device, as well as coupled between enclosure 18 and frame 56. As illustrated, adaptive mounts 50 provide two stages of vibration damping or isolation for data transfer mechanism 52.

The adaptive mounts between the enclosure and the frame and the frame and the housing may have similar or dissimilar damping characteristics without departing from the spirit of the invention. Moreover, as illustrated in FIG. 5, adaptive mounting may be confined in some embodiments to structures external to a data storage device, e.g., so that adaptive mounting may be provided for purely conventional disk drive designs. Of course, as mentioned above, adaptive mounting may also be incorporated internally within a data storage device 14 consistent with the invention.

Data transfer mechanism 52 as illustrated is a rotary disk drive type mechanism using a magnetic disk media. However, other types of data transfer mechanisms could be used without departing from the spirit of the invention, e.g., optical, magneto optical, etc.

Data transfer mechanism 52 is comprised of a base 100 to which other components of the mechanism are mounted. Base 100 may include a bottom, a top and sidewalls. A head 102 is located proximate the end of an actuator 104 which rotates about a pivot point 106 under the action of a voice coil 108 of an actuator 110. Head 102 interacts with a disk of recordable magnetic media 112 mounted on a rotating spindle 114 which is rotated by a motor (not shown). Thus, head 102 is capable of reading and writing data disposed radially about disk 112 in tracks 115. The tracks 115 are divided into sectors 116. Certain of these sectors 116 in each track 115 are devoted to bursts of positioning information. When read by head 102, the sectors 116 include positioning information allow deduction of the radial position of the head 102 and production of a position error signal (PES) 126. This allows the head 102 to be positioned at the centerline of a track 114 using a servo control system that controls motor 110. Electrical connectivity with the various components within data transfer mechanism 52 is available through connector 118.

Enclosure 18 includes a backplane 120 having a bus to which a ribbon cable 122 connects to connector 118 on data transfer mechanism 52. The bus may interface the data storage device 14 with other devices in an array 12, as shown in FIG. 2.

A controller 124 monitors the position error signal (PES) 126 from the data transfer mechanism 52 head 102 and develops an electromotive force, such as electromotive force 76 discussed in conjunction with FIG. 4, optimizing the stiffness and damping parameters of the adaptive mounts 50 using an algorithm. The algorithm may be based on minimizing the PES signal at a specific frequency such as that of the spindle motor or it may be a performance index based on a statistical parameter, such as the average variance of the PES. Depending on the unique and vibrational environment, the adaptive mounting system will optimize its damping accordingly.

It will be appreciated by one of ordinary skill in the art having the benefit of the instant disclosure that the PES of the same data storage device to which an adaptive mount is coupled, and/or that of another data storage device altogether, may be used to drive an adaptive mount consistent with the invention. For example, the PES of one disk drive in an array could be used to control the adaptive mounts coupled to one or more other disk drives in the array.

In addition, various parameters other than the PES may be used to control the damping of an adaptive mount consistent with the invention. For example, in some embodiments, a vibration sensor or accelerometer may be used to detect vibrations. Still other signals generated in a data transfer mechanism may be used to drive an adaptive control algorithm, e.g., read errors, write errors, write aborts, electromotive force (EMF) in a voice coil, etc.

Figure 6:
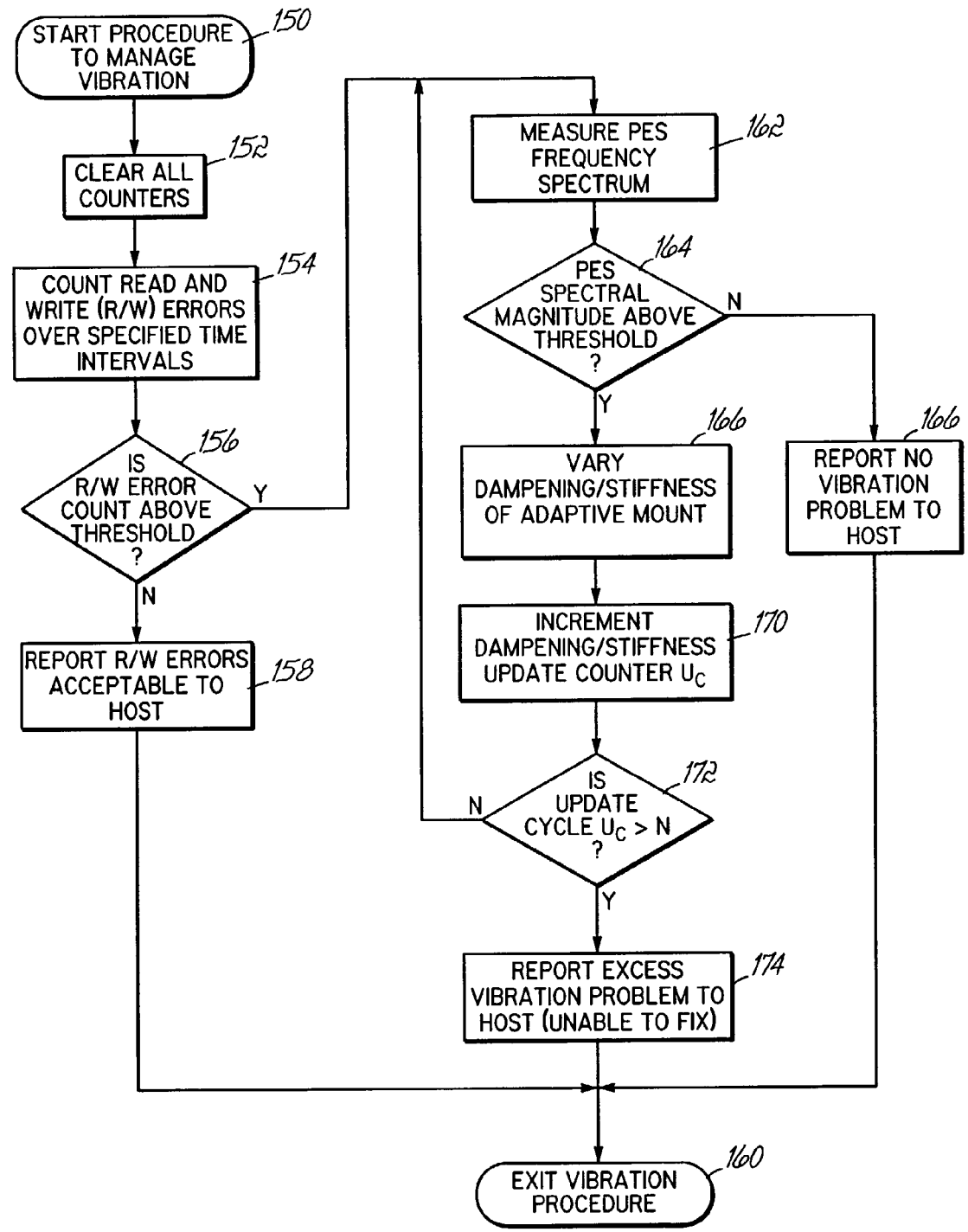
FIG. 6 is a flowchart illustrating an algorithm for varying the damping effect of an adaptive mount, as shown in FIGS. 1, 2, 4 and 5.

Referring to FIG. 6, a flowchart illustrating a procedure 150 to manage vibration in a data storage device having a PES is illustrated. Procedure 150 may be advantageously conducted in controller 124 shown in and discussed in conjunction with FIG. 5. Procedure 150 may also be conducted in a host system, such as host system 10, or a personal computer, such as personal computer 32, both of which were described in conjunction with in FIG. 2. Those skilled in the art will appreciate that procedure 150 could also be conducted in other devices having appropriate processing capabilities, including within the controller of a data storage device or a disk array, among others.

Procedure 150 begins by clearing a plurality of counters in step 152. In step 154, the counters are used to count the number of read and write errors over a specified time interval.

In step 156, the count is compared to threshold numbers for read and write errors. If the count is below a threshold, the number of read/write errors is reported to a host as being acceptable in step 158. The procedure 150 is then exited in step 160.

However, if the count is above a threshold, the frequency spectrum of the PES is measured in step 162. One technique of measuring the frequency spectrum of a signal is to perform what is referred to a Fast Fourier Transform (FFT). A FFT is an algorithm that converts a sampled valued function of time into a sampled complex valued function of frequency. Those skilled in the art will appreciate that other methods of measuring frequency spectrum may also be used without departing from the spirit of the present invention.

In measuring the frequency spectrum of a PES using a FFT, the resonant frequencies associated with sources of vibration may be determined. For example, one frequency may be associated with an out of balance disk, whereas another frequency might be associated with fan vibration, while other sources of vibration may be associated with other resonant frequencies. Thus, the source of the vibration might be identified and the damping of an advantageously placed adaptive mount adjusted.

Step 164 shows the comparison of the magnitude of the resonant frequencies associated with sources of vibration being compared to thresholds for those frequencies. If the magnitudes of the resonant frequencies are not above their thresholds, a report of no vibration problem is made to a host in step 166 and the procedure exited in step 160.

However, if the magnitude of one of the resonant frequencies exceeds its associated threshold, the damping of the adaptive mount is varied, thus decreasing or increasing the stiffness of the mount, in step 168. The particular manner in which the stiffness of the adaptive mount is selected may vary in different applications. For example, a look-up table or equation/algorithm may be used to select a control signal for the adaptive mount based upon the identified resonant frequencies. In the alternative, an adaptive feedback control may be used to selectively increase/decrease the damping effect until an optimal PES is obtained. Other criteria and optimization methods of selecting an appropriate control signal may be used in the alternative.

Next, in step 170, an update cycle counter ($U_c$) associated with the damping and/or stiffness is updated. Then, in step 172, the count of the update cycle counter is then compared to a number (N) that may be set by a user and selected for a device. If the count of the update cycle counter is less than the number (N), the procedure goes to step 162. However, if the count of the update cycle counter is greater than the number (N), a report of excessive vibration is report to a host in step 174 and the procedure 150 exited in step 160.

It will be appreciated that routine 150 is merely exemplary in nature. Other control routines may be used in the alternative.

By virtue of the foregoing there is thus provided an adaptive mount that may be used to reduce the effects of both internal and external vibrations errors in a data storage device, often increasing reliability and reducing data transfer errors. In addition, for data storage devices such as disk drives and the like, reducing the effects of vibrations often permits track densities to be increased and access times to be reduced without concern for excessive vibration induced errors.

While the invention has been illustrated by the description of the embodiments thereof, and while the embodiments have been described in considerable detail, it is not the intention of applicant to restrict or in any way limit the scope of the appended claims to such detail. Additional advantages and modification will readily appear to those skilled in the art. The invention in its broader aspects is therefore not limited to the specific details, representative apparatus and method, and illustrative examples shown and described. Accordingly, departure may be made from such details without departing from the spirit or scope of applicants' general inventive concept.

What is claimed is:

1. A data storage device comprising:
   a data transfer mechanism, and
   an adaptive mount coupled to the data transfer mechanism and configured to dampen the transfer of vibration at least one of to and from the data transfer mechanism in response to an electrical stimulus, and wherein the adaptive mount includes an electrorheological (ER) fluid.

2. The data storage device of claim 1 wherein the adaptive mount further includes electrodes.

3. A data storage device comprising:
a data transfer mechanism, and
an adaptive mount coupled to the data transfer mechanism and configured to dampen the transfer of vibration at least one of to and from the data transfer mechanism in response to an electrical stimulus, and wherein the adaptive mount includes a magnetorheological (MR) fluid.

4. A data storage device comprising:
a data transfer mechanism, and
an adaptive mount coupled to the data transfer mechanism and configured to dampen the transfer of vibration at least one of to and from the data transfer mechanism in response to an electrical stimulus, and wherein the adaptive mount includes an electrostatically stricted polymer (ESSP).

5. An apparatus comprising:
a structural member configured to support a data transfer mechanism; and
an adaptive mount coupled to the structural member and configured to dampen the transfer of vibration at least one of to and from the data transfer mechanism in response to an electrical stimulus, and wherein the adaptive mount includes an electrorheological (ER) fluid housed in a capsule.

6. The apparatus of claim 5, wherein the adaptive mount includes electrodes.

7. An apparatus comprising:
a structural member configured to support a data transfer mechanism; and
an adaptive mount coupled to the structural member and configured to dampen the transfer of vibration at least one of to and from the data transfer mechanism in response to an electrical stimulus, and wherein the adaptive mount includes a magnetorheological (MR) fluid housed in a capsule.

8. An apparatus comprising:
a structural member configured to support a data transfer mechanism; and
an adaptive mount coupled to the structural member and configured to dampen the transfer of vibration at least one of to and from the data transfer mechanism in response to an electrical stimulus, and wherein the adaptive mount includes an electrostatically stricted polymer (ESSP).

* * * * *